US010935392B2

(12) United States Patent
Trythall et al.

(10) Patent No.: US 10,935,392 B2
(45) Date of Patent: Mar. 2, 2021

(54) INERTIAL SENSOR DATA CORRECTION (71) Applicant: BAE SYSTEMS PLC, London (GB)

(72) Inventors: Simon Trythall, Rochester (GB); John Richard Williams, Rochester (GB); Peter Michael Knight, Rochester (GB)

(73) Assignee: BAE SYSTEMS PLC, London (GB)

( * ) Notice: Subject to any disclaimer, the term of this patent is extended or adjusted under 35 U.S.C. 154(b) by 412 days.

(21) Appl. No.: 15/758,434

(22) PCT Filed: Sep. 9, 2016

(86) PCT No.: PCT/GB2016/052791
§ 371 (c)(1),
(2) Date: Mar. 8, 2018

(87) PCT Pub. No.: WO2017/042576
PCT Pub. Date: Mar. 16, 2017

(65) Prior Publication Data
US 2018/0266847 A1    Sep. 20, 2018

(30) Foreign Application Priority Data

Sep. 11, 2015    (GB) .................................... 1516122

(51) Int. Cl.
*G01C 25/00*    (2006.01)
*G02B 27/01*    (2006.01)

(52) U.S. Cl.
CPC ......... *G01C 25/005* (2013.01); *G02B 27/017* (2013.01); *G02B 27/0179* (2013.01); *G02B 2027/0187* (2013.01)

(58) Field of Classification Search
None
See application file for complete search history.

(56) References Cited

U.S. PATENT DOCUMENTS 4,722,601 A     2/1988  McFarlane
5,574,650 A *  11/1996  Diesel .................... G01C 21/16
                                                                701/505
(Continued)

FOREIGN PATENT DOCUMENTS

EP    1203285 B1    3/2003
EP    1489381 A2    12/2004
(Continued)

OTHER PUBLICATIONS

International Preliminary Report on Patentability and Written Opinion dated Mar. 22, 2018 received in International application No. PCT/GB2016/052791.
(Continued)

*Primary Examiner* — Lina M Cordero
(74) *Attorney, Agent, or Firm* — Scully Scott Murphy and Presser (57) ABSTRACT

A method is provided for determining corrections to rate data output by inertial sensors of a type typically used in tracking changes in orientation of an object. The present invention also extends to a tracker system incorporating the correction functionality of the present invention. The method makes use of rate data output by inertial sensors associated with the object being tracked and rate data derived from measures of orientation supplied by a non-inertial tracker system also associated with the object being tracked and comprises determining from those rate data corrections for errors due to misalignment in rate data output by inertial sensors, by calculating a mapping between vectors linking points in inertial sensor rate space represented by a sample set of received rate data from the inertial sensors and vectors linking points in a derived object orientation rate space represented by a corresponding and synchronised sample set of derived rate data. Corrections for inertial sensor bias may be determined separately from corrections (Continued)

for misalignment-related errors, after correction of inertial sensor rate data for misalignment-related errors by determining the vector translation between a point represented by corrected inertial sensor rate data in the derived object orientation rate space and the point in the same rate space represented by derived rate data synchronised therewith.

16 Claims, 4 Drawing Sheets

(56) References Cited

U.S. PATENT DOCUMENTS

| | | | |
|---|---|---|---|
| 5,645,077 A | 7/1997 | Foxlin | |
| 5,672,872 A * | 9/1997 | Wu | F41G 3/326 |
| | | | 250/330 |
| 6,474,159 B1 * | 11/2002 | Foxlin | G01C 21/12 |
| | | | 73/488 |
| 7,046,215 B1 * | 5/2006 | Bartlett | G01S 5/163 |
| | | | 345/8 |
| 7,640,106 B1 | 12/2009 | Stokar et al. | |
| 8,010,308 B1 | 8/2011 | Churchill | |
| 10,528,126 B2 * | 1/2020 | Trythall | G02B 27/0179 |
| 2004/0149036 A1 | 8/2004 | Foxlin et al. | |
| 2013/0238277 A1 | 9/2013 | Sasakura et al. | |
| 2014/0336970 A1 | 11/2014 | Troni-Peralta et al. | |
| 2015/0317838 A1 * | 11/2015 | Foxlin | G02B 27/0093 |
| | | | 345/633 |

FOREIGN PATENT DOCUMENTS

| | | |
|---|---|---|
| EP | 1944678 A1 | 7/2008 |
| EP | 2026037 A2 | 2/2009 |
| EP | 2040036 A2 | 3/2009 |
| GB | 2143948 A | 2/1985 |
| WO | WO 00/52563 A1 | 9/2000 |
| WO | WO 2005/052718 A2 | 6/2005 |
| WO | WO 2014/022664 A2 | 2/2014 |

OTHER PUBLICATIONS

International Search Report and Written Opinion dated Dec. 16, 2016 issued in PCT/GB2016/052791.
GB Search Report dated Feb. 27, 2017 issued in GB 1615364.5.
GB Search Report dated Feb. 29, 2016 issued in GB 1516122.7.

* cited by examiner

INERTIAL SENSOR DATA CORRECTION

The present invention relates to the determination of errors in data output by inertial sensors when used to track changing orientation of an object and in particular, but not exclusively, to the determination of corrections to be applied to such data to correct for the determined errors. The present invention finds particular application in the determination and tracking of orientation of a helmet or other body-worn device using inertial sensors.

It is known to include a helmet or head tracker system in a helmet or head-mounted display system in which the positioning of symbols or other artefacts in the display is to be determined according to orientation of the user's head relative to a movable reference frame, for example relative to a cockpit or other interior region of an aircraft or to a driver's or other position in a land vehicle or other type of vehicle.

Various different types of tracker system are known, using a variety of different sensor technologies. For example, *Proc. SPIE* 8735, Head- and Helmet-Mounted Displays XVIII: Design and Applications, 873502 (May 16, 2013) describes a hybrid optical/inertial helmet tracker system for use with head and helmet-mounted displays. An example of a helmet tracker using electromagnetic techniques is available from Polhemus® Inc, for example as described in a White Paper entitled 'Accuracy and Resolution in Electromagnetic 6 Degree-of-freedom (6DOF) Measurement Systems', APB 8500-001A, available from http:///www.polhemus.com. However, known tracker systems are not generally able to anticipate some of the particular needs of head or helmet-mounted digital display systems relying upon an associated tracking system to supply orientation data that can be used to generate and position space-stabilised symbols or other artefacts in the display, i.e. symbols that appear to a user of the display to be fixed in a far-field view of space, aligned with an externally visible point or object, despite head movement.

The present invention is defined, in its various aspects, in the attached claims. In particular, according to a first aspect of the present invention, there is provided a method for correcting errors in rate data output by inertial sensors indicative of a rate of change in orientation in inertial space of an object to which the inertial sensors are attached, the object also having associated therewith a non-inertial tracker system arranged to determine orientation of the object referenced to a frame of reference of a moveable platform with which the object is associated, the method comprising the steps:

(i) receiving rate data output by the inertial sensors;
(ii) receiving orientation data from the non-inertial tracker system;
(iii) receiving orientation data indicative of orientation of the moveable platform in inertial space;
(iv) deriving rate data from a synchronised combination of orientation data received at steps (ii) and (iii) to provide a measure of the rate of change in orientation of the object in inertial space;
(v) determining, from a synchronised combination of rate data received at step (i) and rate data derived at step (iv), a correction for errors in rate data output by the inertial sensors due to misalignment, including non-orthogonality of axes of the inertial sensors or a difference in alignment of one or more axes of the inertial sensors and corresponding axes in a frame of reference of the non-inertial tracker system; and
(vi) applying the correction determined at step (v) to rate data output by the inertial sensors,
wherein, at step (v), the correction is defined by a mapping between vectors linking points in an inertial sensor rate space represented by a sample set of rate data received at step (i) and vectors linking points in a derived object orientation rate space represented by a corresponding synchronised sample set of rate data derived at step (iv).

Advantageously, by this method, errors due to inertial sensor bias may be identified separately from errors due to misalignment, in an example embodiment of the present invention, by:

(vii) receiving rate data output by the inertial sensors and, synchronised therewith, rate data derived at step (iv);
(viii) applying to the rate data output by the inertial sensors received at step (vi) the correction due to misalignment determined at step (v);
(ix) determining a vector translation between a point in the derived object orientation rate space represented by the corrected rate data and a point in the derived object orientation rate space represented by the synchronised derived rate data received at step (vi), the determined vector translation representing a correction for bias in rate data output by the inertial sensors; and (x) adding the correction for bias determined at step (ix) to the rate data corrected at step (vi).

In an example embodiment, step (v) comprises:
(a) selecting a sample set of four measures of rate data received at step (i) representing a substantially tetrahedral arrangement of points in the inertial sensor rate space;
(b) selecting four respectively synchronised measures of rate data derived at step (iv) representing corresponding points in the derived object orientation rate space;
(c) defining three vectors linking a selected point to the other three points in the inertial sensor rate space and defining three corresponding vectors linking the respective corresponding points in the derived object orientation rate space;
(d) determining a mapping between the three linking vectors in the inertial sensor rate space and the three corresponding linking vectors in the derived object orientation rate space, the mapping representing the correction.

In order to update the determined corrections, in an example embodiment, the method further comprises the step:
(xi) testing each subsequently received measure of rate data from the inertial sensors until a new measure is identified defining a new point in the inertial sensor rate space forming a substantially tetrahedral arrangement of points with the points defined by the three most recently received measures of rate data in the sample set output by the inertial sensors, the new measure thereby replacing the oldest received measure of rate data in the sample set output by the inertial sensors, and selecting the corresponding rate vector derived at step (iv) to replace the oldest in respect of the derived object orientation rate space, thereby triggering the determination of a new correction by steps (c) and (d).

Various filtering techniques may be applied to data intended for use in determining corrections. In one example, step (i) further comprises applying a first type of filtering to a sample of rate data received from the inertial sensors to define mean rate data representative of the sample for use in subsequent steps of the method. In addition, step (i) further comprises applying a second type of filtering to mean rate data resulting from an application of the first type of filtering and step (iv) further comprises applying the second type of filtering to derived rate data, thereby to suppress noise in the rate data. The second type of filtering may comprise applying a finite impulse response filter or an infinite impulse response filter.

In an example operation of the method, steps (i) to (v) and steps (vii) to (ix) may be operated in a cyclic process representing a corrections update cycle and steps (vi) and (x) in a cyclic process representing a tracker cycle, wherein the corrections update cycle period is a predetermined integer multiple of the tracker cycle period.

In an example embodiment, step (v) further comprises operating a stabilisation control process, triggered to operate over a sequence of corrections update cycles.

A stabilisation control process of this type helps to reduce the impact of potentially large corrections upon users of the data from the inertial sensor arrangement during a period over which the sample set is evolving and stabilising to a sample set representative of a true basis for determining misalignment errors and corresponding corrections.

In a further example embodiment, step (vi) further comprises operating a damping process over a sequence of tracker cycles to smooth the application of the correction to be applied in respect of the most recent corrections update cycle. In addition, step (x) further comprises operating a damping process over a sequence of tracker cycles to smooth the application of the bias correction to be applied over the sequence of tracker cycles.

A damping process of this type further limits the impact upon users of the data of potentially large corrections by introducing each newly calculated misalignment correction and/or bias correction gradually over a number of tracker cycles.

According to a second aspect of the present invention, there is provided a tracker system for determining orientation of an object, comprising:

an inertial sensor arrangement associated with the object, arranged to output rate data providing cyclic indications of a rate of change in orientation of the object in inertial space;

a non-inertial tracker system associated with the object, arranged to output cyclic determines of orientation of the object, referenced to a frame of reference of a moveable platform associated with the object;

a source of orientation data providing cyclic indications of orientation of the moveable platform in inertial space;

a rate data generator for converting successive determinations of orientation of the object by the non-inertial tracker system combined with respective synchronised measures of orientation of the moveable platform into respective measures of rate data indicative of a rate of change in orientation of the object in inertial space;

a corrector component arranged to determine and to apply corrections to rate data output by the inertial sensor arrangement in respect of a given cycle by the method defined according to the first aspect of the present invention; and an integrator component to receive corrected rate data from the corrector component and to calculate therefrom an orientation of the object referenced to inertial space.

In example embodiments of this second aspect, the non-inertial tracker system is an optical tracker system, an acoustic tracker system or a magnetic tracker system.

In another example embodiment, the object may be a head or helmet or other body-worn item to which the inertial sensor arrangement is attached and the non-inertial tracker system is arranged to determine and to output data indicative of the orientation of the head or helmet or other body-worn item.

According to a third aspect of the present invention, there is provided a computer program product comprising a data carrier having stored thereon software code means, or means for access thereto, which when installed and executed upon a digital processor are arranged to implement the method steps defined according to the first aspect of the present invention recited above.

According to a fourth aspect of the present invention, there is provided a digital processor programmed to implement the method steps defined according to the first aspect of the present invention recited above.

Example embodiments of the present invention will now be described in more detail with reference to the accompanying drawings, of which.

Embodiments of the inertial sensor data correction method according to the present invention may be incorporated, for the purposes of describing example embodiments, in a tracker system for tracking changes in orientation of an object relative to an inertial reference frame, or relative to a fixed, moving or moveable platform with which the object may be associated or travelling. The object may be considered associated with the moveable platform if the magnitude of relative velocity of the object and the moveable platform is substantially zero at a time of determining the object's orientation relative to the platform. Embodiments of the present invention will be described below in the example context of a helmet tracker system intended for use with the helmet of a pilot of an aircraft. More particularly, embodiments of the present invention will be described in the context of such a helmet tracker system when used in association with a helmet-mounted display system. However, the present invention may be applied in the tracking of orientation of other types of object associated with a moveable platform.

The description that follows is of a logical system architecture designed to explain the principles underlying operation of the data correction techniques of the present invention. It will be clear to a notional skilled person that the methods described may be implemented using an object-oriented data processing architecture in which functional components of the system may be combined and distributed differently to that in a logical sequential architecture to be described below. However, the principles of operation are likely to remain substantially unchanged and the description that follows may at least serve as a detailed requirements specification for the functions to be implemented in whatever data processing architecture is chosen.

For the purposes of the description that follows, the following conventions and terminology will be assumed for the labelling of axes and rotations. Axes will be labelled 'x', y and 'z' and angles of rotation will be labelled as $\omega$, $\theta$ and $\varphi$. Where the angles of rotation as defined as Euler angles: $\omega$ is an Azimuth angle; $\theta$ is an Elevation angle; and $\varphi$ is a Roll angle. Where axes and rotations are defined with respect to Avionic Axes, the following conventions will apply:

axes are defined with respect to an origin O of a moveable object (e.g. helmet or aircraft), the origin O and direction of the axes being defined typically according to mechanical criteria;

+x is a forward direction;
+y is to the right;
+z is downwards;
+ω is a clockwise rotation ('yaw') about the +z direction;
+θ is a clockwise rotation ('pitch') about the +y direction;
+φ is a clockwise rotation ('roll') about the +x direction.

For convenience, the orientation of a tracked object or helmet and the orientation of a moveable platform or aircraft, relative to a given frame of reference, will be defined using quaternions.

In a typical head or helmet-mounted display system, a waveguide display or a visor projection display arrangement is provided; generating images visible to one or both eyes of a user. The images are typically in the form of symbols or other display artefacts, displayed so as to appear overlain on an external scene viewable through the otherwise transparent waveguide or visor, the waveguide or visor acting as a combiner. The symbols or other display artefacts may include anything from monochrome symbols in a predetermined symbol set, data or other text information through to full colour video imagery or a view provided of the external scene by a night vision camera during night-time use.

There are two particular situations in which helmet orientation needs to be taken into account when positioning symbols within a helmet-mounted display: display of symbols of a virtual head-up display, geometrically aligned to a centre line of the aircraft; and display of symbols such that they appear in fixed alignment with a ground-based object or other object in a fixed position relative to the Earth, viewable outside the aircraft. In each case the orientation of one or both of the helmet relative to the aircraft and the aircraft relative to the Earth may be changing, the former potentially rapidly.

Various different head or helmet tracking systems are known based upon inertial sensor technologies, non-inertial sensor technologies or a mixture of inertial and non-inertial sensor technologies. For example, in a helmet tracker system for use in an aircraft or other type of enclosed space, an optical tracker system may be used comprising a fixed arrangement of infra-red light-emitting diodes (LEDs) mounted on the helmet and an array of cameras mounted at known positions in a surrounding cockpit or cabin. Helmet orientation may be tracked by energising the LEDs in controlled patterns in a regular pulse cycle and processing the camera images of the helmet LEDs. Each pulse cycle provides an independent opportunity to determine helmet orientation.

It is also known to use an electro-magnetic tracker arrangement or an acoustic tracker arrangement in such confined spaces comprising a combination of sensors and transmitters, with the transmitters mounted on the helmet and the sensors at fixed positions within the space, or vice versa.

One disadvantage of optical or equivalent non-inertial tracker systems when used with display systems is an inherent latency in determining updates to helmet orientation. This latency may be compounded with any inherent latency in adjusting symbol positions in an associated display system such that the overall system response to determined changes to helmet orientation can cause pilot nausea. This occurs when movements of the head do not result in substantially simultaneous and corresponding movements in displayed symbols intended to appear fixed to some external reference point. Attempts to minimise latency in such applications have led to the use of miniature inertial sensors, be they accelerometers, tilt sensors or miniature gyroscopic sensors, small enough to be mounted on the helmet with two or three such sensors being aligned with respective orthogonal axes ('gyro axes'). Inertial sensors are capable of producing data indicative of a rate of change of orientation more quickly than optical, magnetic or acoustic sensors, for example, are capable of indicating a change in orientation. However, miniature inertial sensors of a type suitable for helmet-mounting may output orientation rate data that is prone to varying bias errors, noise or other types of 'installation' or 'misalignment' error, for example arising from imprecise mounting on the helmet and non-orthogonality of the gyro axes from manufacture.

It is known to combine inertial sensors on the helmet with a non-inertial helmet orientation sensor system and to combine data from the two sources in a process to calculate and to apply corrections to the inertial sensor rate data. This helps to prevent the accumulation of errors when calculating helmet orientation from the inertial sensor measurements.

In the present invention a method has been devised to make use of data from a non-inertial tracker system to determine the errors as would typically arise in such installations and hence to determine the corrections required. A number of processing components are provided to process the data output from those sources in a novel and inventive way to determine any errors in rate data output from the inertial sensors and so implement corrections to rate data from the inertial sensors to provide a more reliable input to the determination of helmet orientation at any given time. The method of the present invention offers advantages over known alternative approaches to the correction of errors typical in installations using such miniature inertial sensors.

In the description that follows, data variables will be named according to the naming structure $$\text{<Treatment><Tracked Frame><Data Type>}_{\text{<Data Source>}}\text{<Reference Frame>}$$

in which:

<Treatment> defines any pre-processing applied to the data, in particular

'f'—indicates the data are filtered, using a known or specified filtering technique;

<Tracked Frame> comprises an upper case letter designating the frame of axes being tracked and to which the data relates, including 'H'—Helmet Shell (helmet-referenced axes),
'G'—Helmet-mounted Gyros (gyro axes), and
'A'—Aircraft (aircraft-referenced axes);

<Data Type> is used to designate data defining a 'Rate' of change, as applicable;

<Data Source> is a lower case letter, as a subscript, defining the most recent origin of the data, i.e. the sensor system or processing stage from where the data were generated, including 'o'—Optical Helmet Tracker,
'g'—Helmet-mounted Gyros, and
'c'—gyro data Corrector; and <Reference Frame> defines the frame of reference relative to which the data define the orientation of the Tracked Frame, including 'W'—axes of the inertial frame of reference, also referred to as 'World axes' or 'inertial space', and 'A'—axes fixed to the Aircraft.

Overview of Core Components

Core components and functionality of an example embodiment of a hybrid helmet tracker system as may beneficially incorporate the present invention will now be described in outline with reference to FIG. 1. For convenience, orientation of a tracked entity with respect to defined axes will be expressed as a quaternion, unless otherwise specified.

Figure 1:
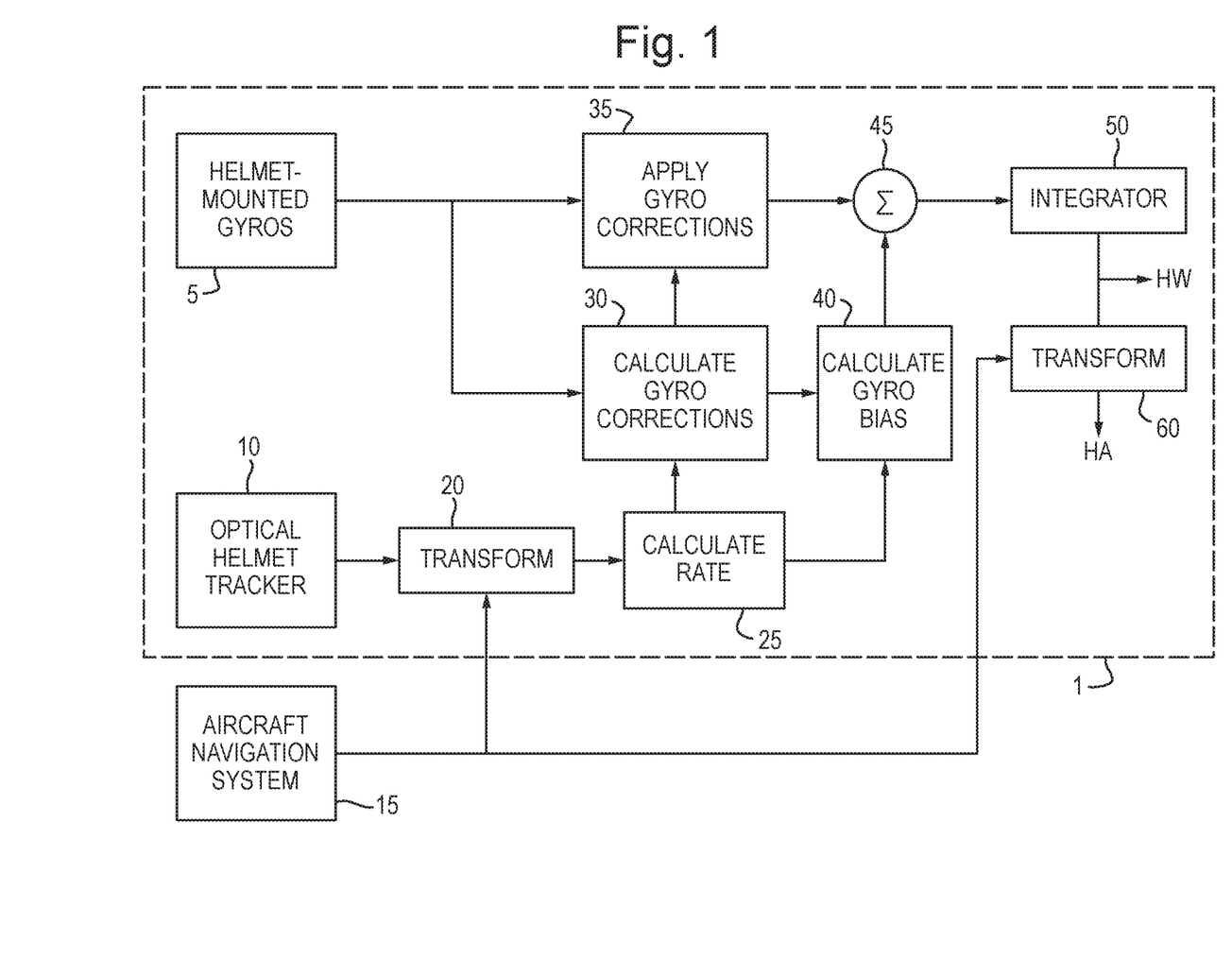
FIG. 1 depicts a functional architecture for a helmet tracker system that may incorporate example embodiments of the present invention.

Referring to FIG. 1, a logical architecture depicts, from a functional perspective, a set of core components of the hybrid helmet tracker system 1 for determining helmet orientation relative to an inertial reference frame or relative to a host aircraft, as required. In such an application, the hybrid helmet tracker system 1 makes use of sensor data from three sources.

An arrangement of helmet-mounted inertial sensors—Helmet-mounted Gyros 5—comprising three miniature gyroscopes (gyros), e.g. microelectromechanical systems (MEMS) gyros, each associated with a respective one of three nominally orthogonal gyro axes. Each gyro is able to sense a rate of change in orientation of the system of Helmet-mounted Gyros 5 in inertial space, resolved along its respective gyro axis. The system 5 generates rate vectors $GRate_g$ at a frequency of several kilohertz, whose components define the rate of change in orientation of the gyro system 5 sensed by the individual gyros about their respective gyro axes.

An Optical Helmet Tracker system 10 including components mounted on the helmet and in the cockpit of an aircraft to determine orientation of the helmet $H_oA$, i.e. orientation of a set of helmet-referenced axes relative to aircraft axes, and to output data indicative of a determined helmet orientation, typically at a frequency of 180 Hz.

An Aircraft Navigation System 15, though not typically a component of the hybrid helmet tracker system 1, typically based upon an inertial sensor system using laser gyroscopes. The Aircraft Navigation System 15 outputs data, from time to time (typically once every 20 ms to 90 ms), defining orientation of the aircraft, specifically of a set of aircraft-referenced axes, relative to a navigation frame of reference, typically a 'local level north' pointing frame of reference. Aircraft orientation data output by the Aircraft Navigation System 15 may be received by the hybrid helmet tracker 1 and used as a measure of aircraft orientation AW relative to the inertial reference frame. Variations in the alignment of the navigation frame and the inertial reference frame due Earth rotation and movement of the aircraft over the ground may be validly ignored over the time periods during which these data are used in the present invention, as will become clear from the description that follows.

A typical Aircraft Navigation System 15 has an interface to and outputs data over a standard data bus, one example being MIL-STD-1553B, provided within the aircraft. The Aircraft Navigation System 15 outputs an updated measure of aircraft orientation AW over the data bus so that it may be received by whichever of the installed aircraft systems require it. The hybrid helmet tracker 1, in particular, may be linked to the standard data bus so that it may also receive updated aircraft orientation data from the Aircraft Navigation System 15. However, as an alternative source of data defining aircraft orientation relative to the inertial reference frame, an inertial or other type of sensor arrangement able to determine aircraft orientation in inertial space may be mounted within the aircraft for use by the hybrid tracker system 1.

In example implementations of the present invention, helmet orientation is determined on a cyclic basis, corresponding to a need to reposition certain types of symbol according to changing helmet orientation being displayed in an associated digital helmet-mounted display. During each cycle—to be referred to as a 'tracker cycle'—helmet orientation is determined from data supplied by the Helmet-mounted Gyros 5, any errors in those inertial sensor data being firstly corrected with reference to data captured from the Helmet-mounted Gyros 5 combined with data supplied by the Optical Helmet Tracker 10 and aircraft orientation data received over the data bus. Conveniently, the duration of a tracker cycle may be arranged to match the period between successive image refreshes in the associated digital display, although this is not essential.

In embodiments of the present invention, when calculating corrections to inertial sensor data, for example, it has been found convenient to work with data defining orientation of a helmet as sensed by the different associated sensor systems (5, 10) referenced to a common frame of reference—the inertial frame of reference, also referred to herein as 'inertial space' or 'World axes'. Data output by the Helmet-mounted Gyros 5 relate to motion of the gyros in inertial space whereas data output by the Optical Helmet Tracker 10 define motion of the helmet relative to a frame of reference fixed to the aircraft. It is therefore desirable to relate aircraft-referenced data from the Optical Helmet Tracker 10 to inertial space. With this objective in mind, a Transform component 20 is provided to receive a measure of helmet orientation $H_oA$ relative to the aircraft from the Optical Helmet Tracker 10 expressed as a quaternion and to transform it by quaternion multiplication into a derived helmet orientation $$H_oW = AW \times H_oA \quad (1)$$

relative to the inertial reference frame using the aircraft orientation AW received over the standard bus from the Aircraft Navigation System 15. If the Optical Helmet Tracker 10 uses a different convention for defining orientation to that used by the Aircraft Navigation System 15 or by the system of Helmet-mounted Gyros 5, then the Transform component 20 is also arranged to convert the output of the Optical Helmet Tracker 10 so as to express helmet orientation using the same convention as used by the other two sensor systems 5, 15.

In other applications of the present invention, the non-inertial tracker system associated with an object may include further means for determining the orientation of axes of the non-inertial tracker system relative to the inertial frame of reference at any given time so that the transformation in equation (1) may be carried out.

If necessary, known techniques may be applied to synchronise the data being output from the various data sources such that data from the Optical Helmet Tracker 10 being used to determine errors in rate data from the Helmet-mounted Gyros 5 relate to the same helmet movements at the same time and that any orientation data (e.g. AW) relating to an associated moving platform are synchronised with the determination of helmet orientation by the Optical Helmet Tracker 10 when implementing equation (1).

As a further convenience, for the purposes of subsequent data processing combining rate-of-change data from the Helmet-mounted Gyros 5 with data from the Optical Helmet Tracker 10, a Calculate Rate component 25 is provided to 'differentiate' the optically-sensed orientation measurements $H_oW$ to provide a rate of change of orientation vector $HRate_o$, over a predetermined time interval, representing a point in a 'derived helmet orientation rate space'. That is, the components of a rate vector $HRate_o$ define the derived optically-sensed rates of change in helmet orientation in inertial space resolved along the helmet-referenced axes.

In an ideal arrangement, the axes of the Helmet-mounted Gyros 3 are substantially aligned with the helmet-referenced axes. However, in practice, there are likely to be differences in alignment or other installation-related or manufacturing errors. The present invention is able to detect the effects of such errors in the rate data output by the Helmet-mounted Gyros 5 and so determine corrections required to compensate for such errors with a configurable level of authority. That is, various configurable processes operate, as will be described below, to determine when and to what extent determined corrections may be applied to rate data being output by the Helmet-mounted Gyros 5.

Besides errors arising during installation or manufacture, rate data output by miniature gyros of a type suitable for helmet mounting may be subject to 'noise', characterised by the distribution in rate measurements output over a series of rate vectors $GRate_g$ for a given helmet movement, or even when the gyros are stationary. More significantly, rate data output from individual gyros are also likely to include bias errors, typically of the order of 0.1°/min or more, which may also change, for example with varying temperature of the gyros, causing accumulating errors in determined orientation of the helmet if not corrected for.

For these reasons it is also known to include a non-inertial sensor arrangement—in example applications of the present invention the Optical Helmet Tracker 10 provides such a non-inertial sensor arrangement—to provide data from which corrections to gyro rate data may be calculated by an innovative technique, to be described in detail below. By this technique, the calculation of corrections for errors arising during installation or manufacture may be carried out separately, and potentially only once, from the calculation of corrections for bias.

To ensure that the data used to calculate gyro data corrections are relatively noise-free, recognising that a rate of change in orientation derived from measurements by the Optical Helmet Tracker 10 may also be subject to noise effects, the inventors have provided additional data filtering components, as will be discussed in more detail below, to reduce the effects of noise in rate data output by, or derived from output by the two helmet orientation sensor systems 5, 10. In particular, to help counter the effects of noise in the rate data output from the Helmet Mounted Gyros 5, multiple readings of $GRate_g$ rate data are received from the Helmet-mounted Gyros 5 over a predetermined sampling period during each tracker cycle and an average rate vector GRate is calculated, representative of the sample.

A processing component—Calculate Gyro Corrections 30—is provided to receive filtered $HRate_o$ rate vectors and the corresponding GRate gyro rate vectors from the Helmet-mounted Gyros 5 and to determine any installation or manufacturing-related errors in the gyro rate data. Specifically, such errors may include: errors in alignment of the gyro axes with the helmet-referenced axes during installation of the Helmet-mounted Gyro system 5 upon a helmet; errors due to non-orthogonality of the gyro axes; and errors due to relative scaling of rate measurements along the gyro axes. The Calculate Gyro Corrections component 30 is then able to calculate a correction to compensate for such misalignment, non-orthogonality or scaling errors and thereby relate the movement sensed by the gyro system 5 more accurately to the actual movement of the helmet.

The determined correction is then applied for that tracker cycle by an Apply Gyro Corrections component 35 to the rate vector GRate derived from a respective sample of rate vectors $GRate_g$ output from the Helmet-mounted Gyros 5.

If it is decided that errors arising from installation or manufacture are unlikely to change over time, then the correction to be applied by the Apply Gyro Corrections component 35 may be determined once, for example during an initial helmet display system configuration step, and not thereafter updated. The determined correction may be stored in or in association with the particular helmet and its associated display system, to be retrieved and applied by the Apply Gyro Corrections component 35 during subsequent operation of the helmet display system 1.

To correct for gyro bias, the determined correction is also applied by the Calculate Gyro Corrections component 30 to a (potentially more recent) filtered GRate vector which is then passed to another processing component—Calculate Gyro Bias 40—along with a suitably filtered and synchronised rate vector $HRate_o$ applicable to the same period of helmet movement, for the calculation of a gyro bias correction. Alternatively, the correction calculated by the Calculate Gyro Corrections component 30 (or otherwise) may be passed to the Calculate Gyro Bias component 40 along with the filtered GRate vector for the correction to be applied, for example if the Calculate Gyro Corrections component 30 has been disabled during normal operation.

The calculated bias correction is added by a summing component 45 to the corrected GRate vector output by the Apply Gyro Corrections component 35 to result in a fully corrected measure of the rate of change in orientation of the helmet as sensed by the Helmet-mounted Gyros 5, expressed as a vector $HRate_c$. The fully corrected rate vector $HRate_c$ represents a point in the 'derived helmet orientation rate space', i.e. a vector whose components define a rate of change of helmet orientation in inertial space, resolved along the helmet-referenced axes.

By fully correcting rate data received from the Helmet-mounted Gyros 5, the benefit of higher expected rate of availability of data from Helmet-mounted Gyros 5 may be exploited with minimal loss of accuracy as compared with the typically slower rate of availability of data from certain types of non-inertial tracker system, such as the Optical Helmet Tracker 10.

Having applied (35, 45) corrections to the latest inertial sensor data to result in the fully corrected rate vector $HRate_c$, a measure of helmet orientation HW relative to the inertial frame of reference, or World axes, is determined by integration in an Integrator component 50.

A Transform component 60 may be provided to transform the orientation HW relative to World axes into a helmet orientation HA relative to the aircraft-referenced axes using the latest measure of aircraft orientation AW as supplied over the standard aircraft data bus by the Aircraft Navigation System 15.

The tracker cycle period of the hybrid helmet tracker system 1 is selected, conveniently, to support the needs of the associated display system or other user of the determined helmet orientation data. In the particular example of a digital helmet-mounted display system, it is desirable to be able to update the position of symbols in the display within a time period of no more than 20 ms, but in practice a shorter period is desirable, enabling not only a more rapid update to displayed information but also to a corresponding reduction in the Prediction Time period $T_p$.

As a further convenience, the tracker cycle period may be selected to correspond to the period between successive measurements of helmet orientation by the Optical Helmet Tracker 10, 5.555 ms in the example mentioned above, being generally less responsive to helmet movement than the Helmet-mounted Gyros 5. However, as mentioned above, the tracker cycle period need not necessarily be linked to the performance of the Optical Helmet Tracker 10. In an alternative arrangement, the rate at which data output by the Helmet-mounted Gyros 5 are sampled may be set to be a multiple of the rate at which data are available from the Optical Helmet Tacker 10, enabling a corresponding reduction in the tracker cycle period.

In a particular embodiment, data output from the Helmet-mounted Gyros 5 may be sampled at 180 Hz, for example, and the Optical Helmet Tracker 10 may be operated at a slower rate, for example at 60 Hz—a period of 16.667 ms between successive measurements.

For any given tracker cycle, a sample of rate data from the Helmet-mounted Gyros 5 provides a measure GRate of rate data that is then fully corrected (35, 45) using the latest calculated corrections for errors. The Integrator 50 uses the corrected rate data $HRate_c$ to determine measures HW and HA of helmet orientation for that tracker cycle. However, the processes for updating the corrections for errors, calculated by the Calculate Gyro Corrections component 30 and the Calculate Gyro Bias component 40, may operate over a different cycle—a 'corrections update cycle'—for convenience, corresponding to the rate at which the Optical Helmet Tracker 10 is operated and so the rate at which new data become available for such calculations.

In describing an example embodiment of the present invention, it will be assumed that the Optical Helmet Tracker 10 is operated at the tracker cycle rate and that data from the helmet orientation sensors 5, 10 are available to the correction calculation components 30, 40 at the tracker cycle rate. Variations in operation of various components of the hybrid helmet tracker 1 to enable the Optical Helmet Tracker 10 to be operated at a different rate to the tracker cycle rate will be discussed below as they arise.

During each 'corrections update cycle', the Calculate Gyro Corrections component 30, in particular, receives the most recently generated one or more GRate vectors and determines their suitability for use in a new calculation of 'misalignment' error and of its correction, as will be discussed in more detail below. A new calculation of the correction is triggered each time suitable GRate data become available, but the time period between successive arrivals of suitable data may in principle extend to any variable number of corrections update cycles, and hence of tracker cycles. During such periods the Apply Gyro Corrections component 35 may need to apply the same correction for each of those tracker cycles pending calculation of an update. However, an alert may optionally be triggered when this duration reaches a configurable time limit to guard against the display of misleading information.

It is also possible that, from time to time, output from the Optical Helmet Tracker 10 will be temporarily unavailable, for example when light signals passing between the helmet-mounted LEDs and the cockpit-mounted sensors are temporarily blocked by pilot hand movement or otherwise. In such a situation, operation of the helmet tracker process may enter a so-called 'coasting' period during which operation of the Calculate Gyro Corrections component 30 and Calculate Gyro Bias component 40 are suspended—there being no new data from the Optical Helmet Tracker 10 on which to base correction calculations. In this situation too, the correction being applied to GRate data by the Apply Gyro Corrections component 35 and the correction for gyro bias being applied by the summing component 45 over the affected tracker cycles remain unchanged until data from the Optical Helmet Tracker 10 next becomes available and the corrections update cycle may restart. A coasting period may last for one or more tracker cycles, limited by a configurable maximum coasting period to ensure that errors, in particular those due to gyro bias, don't accumulate to unusable levels.

Synchronisation and Filtering

As mentioned above, it is convenient, though not essential, to operate a corrections update cycle at the same rate as the tracker cycle rate. It is also convenient, though not essential, to operate the Optical Helmet Tracker 10 at the tracker cycle rate, the tracker cycle rate being thereby limited to a frequency of 180 Hz, in this example. The rate at which the Optical Helmet Tracker 10 is able to measure changes in helmet orientation would be considered sufficiently rapid to support the needs of an associated helmet-mounted display in repositioning symbols in the display and so, for the purposes of explaining the principles, the following section of description will assume these convenient choices for equalising the correction cycle, tracker cycle and Optical Helmet Tracker rates. These choices are illustrated in FIG. 2, providing a view of a corrections update cycle time line for the calculation of corrections to gyro rate data by the Calculate Gyro Corrections component 30 and the Calculate Gyro Bias component 40.

Figure 2:
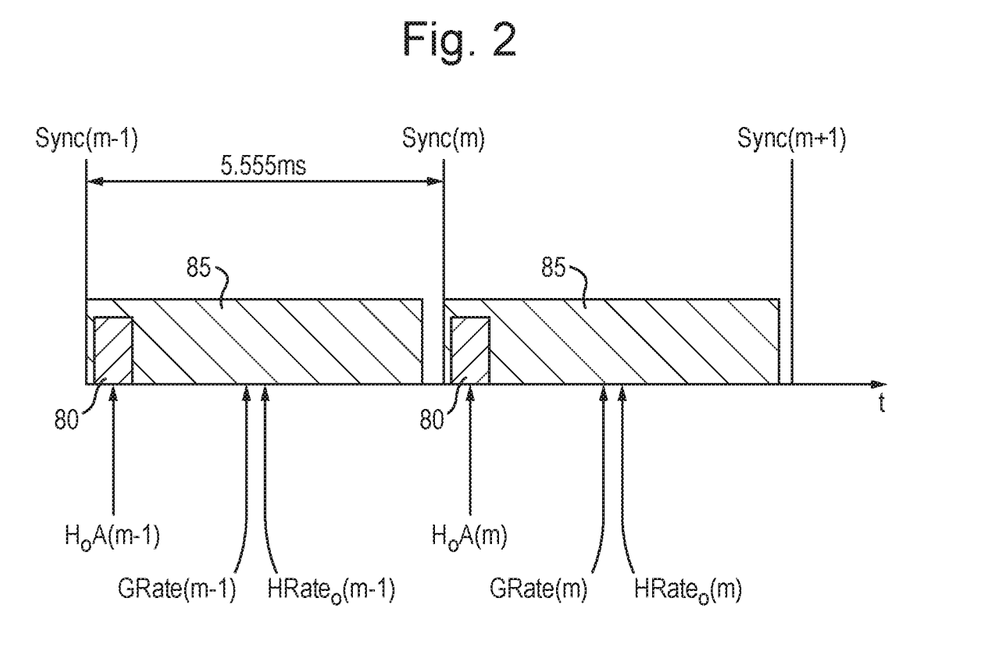
FIG. 2 shows an example timing for a cyclic tracking process that may be used to determine the timing of data availability and operation of example embodiments of the present invention.

Referring to FIG. 1 and additionally to FIG. 2, the main time points are shown relevant to the calculation of corrections for installation or manufacturing-related errors by the Calculate Gyro Corrections component 30 and for the calculation of gyro bias corrections, and updates thereto, to by the Calculate Gyro Bias component 40 during two corrections update cycles m−1 and m, in this example having the same period—5.555 ms—as the chosen tracker cycle period. For the purposes of calculating and updating corrections by the Calculate Gyro Corrections component 30 and/or by the Calculate Gyro Bias component 40, the synchronisation requirements are slightly different to those for the Integrator component 50 which works to tracker cycles using corrected gyro rate data synchronised to the end of each respective tracker cycle.

In particular, calculations of gyro error corrections by the components 30, 40 require, as input, filtered orientation rate data $HRate_o$, derived (25) using successive measures $H_oW$ of orientation data output by the Optical Helmet Tracker 10, substantially synchronised with filtered GRate data captured from the Helmet-mounted Gyros 5, so ensuring that the two input measures relate to the same period of helmet movement. Those data forming an input to the correction calculation components 30, 40 do not necessarily relate to the 'current' tracker cycle during which a fully corrected rate vector $HRate_c$ is to be generated, but they do need to be synchronised with each other. Furthermore, aircraft orientation data AW output by the Aircraft Navigation System 15 and used to derive the helmet orientation $H_oW$ should also be valid at the time of validity of the helmet orientation data $H_oA$ output by the Optical Helmet Tracker 10, i.e. at respective time points $H_oA(m-1)$, $H_oA(m)$, etc.

Rate of change data $HRate_o$ derived by the Calculate Rate component 25 are based upon the change in helmet orientation $H_oW$ in inertial space derived from successive synchronised pairs of measures of $H_oA$ and AW, valid at the time points $H_oA(m-1)$, $H_oA(m)$ for example. The derived rate $HRate_o$ is assumed valid at a time point $HRate_o(m-1)$ mid-way between the time points $H_oA(m)$ of the respective pair; $HRate_o(m)$ being the time of validity of the rate vector $HRate_o$ derived during the next corrections update cycle.

As mentioned above, a first simple type of filtering (by determining an average) is applied to each sample of the raw gyro rate data $GRate_g$ captured over a respective sample period 85. The average gyro rate vector GRate is assumed valid, for the purposes of calculating error corrections, at a time point GRate(m−1), GRate(m), etc. midway through the respective sample period 85.

As can be seen in FIG. 2, the points of validity GRate (m−1) and $HRate_o(m-1)$, GRate(m) and $HRate_o(m)$ are not exactly aligned, but they are considered sufficiently close in time within their respective cycles to be synchronised.

To achieve these various correlation and synchronisation requirements, additional functional components may be incorporated into the logical architecture of FIG. 1, as will now be described with reference to FIG. 3 in another example embodiment of the present invention.

Figure 3:
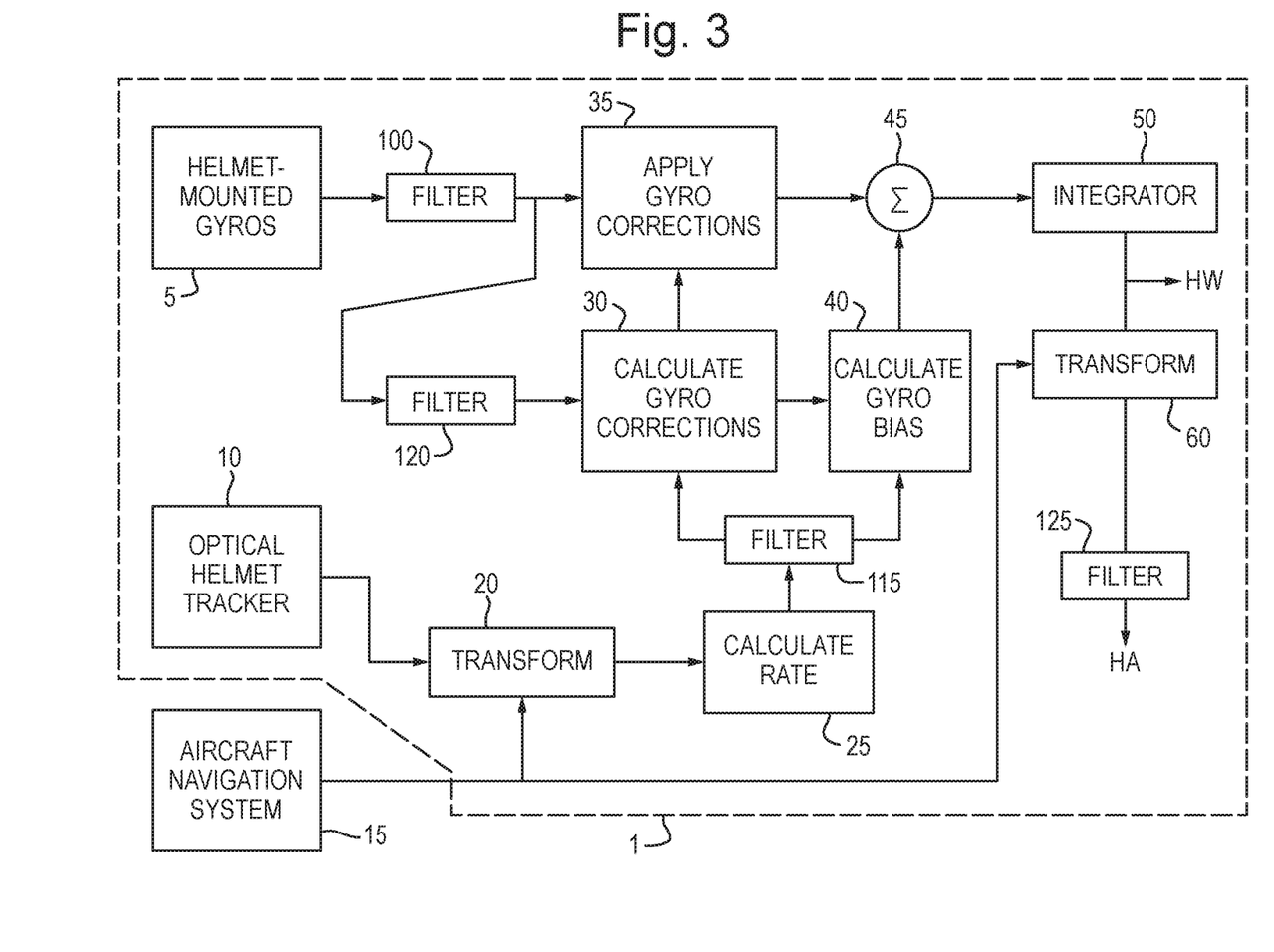
FIG. 3 depicts an enhanced functional architecture for a helmet tracker system that may incorporate example embodiments of the present invention.

Referring to FIG. 2 and additionally to FIG. 3, a logical architecture depicts, from a functional perspective, the set of core components of the hybrid helmet tracker system 1 as shown in FIG. 1 using the same reference numerals, together with additional functional components for pre-processing, filtering and synchronising data, ensuring that noise-reduced data sources and tracker functions are synchronised according to the principles outlined above.

As mentioned above, a first simple type of filtering is applied to the sample of rate vectors $GRate_g$ to reduce noise. A Filter component 100 is therefore provided at the output from the Helmet-mounted Gyros 5 to capture a sample of $GRate_g$ rate data over the predetermined time interval 85 and to calculate a respective average rate vector GRate for the sample.

In deriving a rate of change in helmet orientation vector $HRate_o$ applicable to a delayed corrections update cycle m, the Calculate Rate component 25 uses the two preceding outputs of helmet orientation $H_oW$ relative to World axes from the Transform component 20 which, in respect of delayed corrections update cycle m, are those synchronised to the end of corrections update cycles m−1 and m−2.

A further type of filtering may be applied to both the GRate vectors and to the rate of change of orientation vectors $HRate_o$ derived by the Calculate Rate component 25 to reduce noise in the respective rata data. A Filter component 115 is provided to receive the $HRate_o$ vectors from the Calculate Rate component 25 and to implement a conventional Finite Impulse Response (FIR) filter with half-sine-wave weighting, for example, maintaining a history of $HRate_o$ vectors calculated over recent corrections update cycles and applying the half-sine-wave weighting to the relative contribution by a currently calculated rate vector $HRate_o$ and the historical vectors to result in a filtered rate vector $fHRate_o$. The filtered rate $fHRate_o$ is made available to the Calculate Gyro Corrections component 30 and to the Calculate Gyro Bias component 40. An equivalent Filter component 120 is provided to carry out substantially the same processing as the Filter component 115 upon the GRate vectors being output from the first stage Filter component 100. The resultant filtered rate vector fGRate is passed forward to the Calculate Gyro Corrections component 30. As an alternative to a FIR filter, an Infinite Impulse Response (IIR) filter may be implemented by each of the Filter components 115, 120 with the benefit of reduced data processing requirements.

A final stage of filtering may be applied to the helmet orientation HA with respect to aircraft axes output by the Integrator 50 in a Filter component 125. This final stage of filtering may be achieved in a low-pass filter with adjustable latency, for example a Hanning FIR filter.

Calculation of Gyro Rate Data Corrections

In an ideal installation of the Helmet-mounted Gyros 5 upon a helmet, the axes of the gyros should be perfectly orthogonal and aligned with the helmet-referenced axes used by the Optical Helmet Tracker 10. However, in practice that ideal installation is not achieved. The Calculate Gyro Corrections component 30 operates over a number of corrections update cycles which, as discussed above, may be of the same duration as the tracker cycle period or some predetermined multiple thereof, to gather data from the helmet orientation sensors 5, 10 and to calculate corrections which may be applied (35) to the latest GRate data in a current tracker cycle and so simulate the ideal gyro installation.

The Calculate Gyro Bias component 40 uses the calculated correction by the Calculate Gyro Corrections component 30 in a method for calculating an adjustment for the latest gyro bias to be added (45) to the corrected GRate vector in the current tracker cycle.

An example inventive method for determining the corrections to be applied will now be described according to an example embodiment of the present invention. Whereas the method to be described is being applied in the context of a helmet tracker operating on a moveable platform, it will be apparent to a person of ordinary skill in the field of tracker technology that the cyclic method of gyro correction to be described below may be applied to the determination of corrections to data output by any inertial sensor system in respect of an object, making use of orientation rate of change data derivable from another sensor system associated with the object, whether inertial or non-inertial, able to provide a corresponding cyclic indication of rate of change in orientation of the object in inertial space.

The method implemented by the Calculate Gyro Corrections component 30 is based upon the assembly and maintenance, over a number of corrections update cycles of a sample set of filtered (120) gyro rate data fGRate, satisfying predetermined selection criteria, from which an accurate assessment of the extent of non-orthogonality of the gyro axes and their misalignment relative to the helmet-referenced axes of the Optical Helmet Tracker 10 may be determined. Calculation of a correction, or an update to a correction, is triggered by the assembly of, or an update to, the sample set.

The calculated correction comprises a mapping of vectors linking an arrangement points in gyro rate space represented by the assembled set of gyro rate vectors fGRate onto a corresponding set of vectors linking a corresponding arrangement of points represented by rate vectors $fHRate_o$ in the derived helmet orientation rate space. A key benefit in this approach is the ability, in a single mapping, to compensate for the effects of a rotational misalignment of the gyro axes, any non-orthogonality of the gyro axes and relative scaling by the gyro axes. Furthermore, by this method, the calculation of corrections for such installation or manufacturing-related defects may be determined separately from the corrections for bias, and potentially only once for a given hybrid helmet tracker 1.

This capability for dynamically correcting for a potentially changing misalignment error is of particular benefit in a wider range of applications where miniature gyros are being used under conditions where the gyro alignment might change during use with respect to a reference alignment, for example due to an impact or insufficiently rigid mounting of the gyros relative to a reference frame of the object. In such a case, the Calculate Gyro Corrections component 30 may be operated continuously.

The sample set is assembled from data selected from four different cycles. That is, a set of four filtered fGRate vectors satisfying the selection criteria and generated during four different tracker cycles are combined with four filtered rate of change of orientation vectors fHRate$_o$, derived from measurements H$_o$A by the Optical Helmet Tracker 10, synchronised with the four selected fGRate vectors by the techniques described above. The four selected fGRate vectors each define points in 'gyro rate space'. That is, the components of an fGRate rate vector define the rates of change in orientation of the Helmet-mounted Gyro sensor system 5 in inertial space resolved along the three gyro axes.

The selection criteria for acceptance of an fGRate vector into the sample set relate to the relative positions of the four points they define in gyro rate space, the distance between them and the magnitudes of the fGRate vectors themselves. For a new fGRate vector to qualify for inclusion in the set and to replace the oldest of the existing four vectors, the vector linking the point represented by the new fGRate vector to one of the three most recent points in the set—a designated 'reference' point—is required to be reasonably orthogonal to the plane of the other three points and to exceed a predetermined minimum magnitude. Each selected fGRate vector is also required to satisfy the condition that its individual magnitude falls within a predetermined range. The vectors linking the selected 'reference' point to the other three points in a set selected by these criteria define three edges of a tetrahedral shape, the four points themselves forming the vertices of such a shape. When an fGRate vector is selected, the rate vector fHRate$_o$ having the same time point of validity as the selected fGRate vector is also selected for the set. The fHRate$_o$ vector having the same time point of validity as that of the fGRate vector forming the 'reference' point in gyro rate space is taken to be the 'reference' point in the derived helmet orientation rate space.

The inventors of the present invention have realised that by working with vectors linking points in rate space, rather than the rate vectors themselves, it is possible to isolate errors due to misalignment and scaling, relating to the installation or manufacture of the Helmet-mounted Gyros 5, from errors due to gyro bias. The error, and hence the required correction, due to installation or manufacture of the Helmet-mounted Gyros 5, may be represented by a correction matrix as required to align the substantially tetrahedral arrangement of three linking vectors in gyro rate space to the three time-synchronised linking vectors in derived helmet orientation rate space.

The correction matrix is applied by the Apply Gyro Corrections component 35 to the GRate vector received in respect of the latest tracker cycle. The correction matrix is also used by the Calculate Gyro Bias component 40 to determine the bias error and hence the bias correction to be added by the Summing component 45 to the output of the Apply Gyro Corrections component 35.

To determine the bias error, a correction based upon the latest correction matrix is applied to the most recently available filtered (120) fGRate vector for which a correspondingly synchronised and filtered (115) fHRate$_o$ vector is available, giving a point in the derived helmet orientation rate space. The bias error is then represented by the residual vector correction required to map that point in derived helmet orientation rate space to the point represented by the correspondingly synchronised fHRate$_o$ vector.

To assemble and maintain such a set of fGRate and fHRate$_o$ vectors, the Calculate Gyro Corrections component 30 is arranged, during each corrections update cycle, to test each newly received fGRate vector from the Filter 120 with respect to previously generated fGRate vectors according to the above selection criteria. For example, assuming that a new sample set is to be assembled from start-up or a restart of the system, the Calculate Gyro Corrections component 30 is arranged to implement the following procedure:

(1) If the magnitude of a latest received fGRate vector is below a predefined maximum, it is submitted for inclusion in the sample set of points in gyro rate space. On the first time through, e.g. following power-up or a restart of the system, the received fGRate vector and the corresponding latest received fHRate$_o$ vector are selected as the 'reference' points in the sample set in their respective rate spaces.

(2) Upon receipt of another fGRate vector, defining a new point in gyro rate space, if the magnitude of the vector linking the new point to the reference point in gyro rate space exceeds a predefined minimum, the new point then becomes the reference point and its vector displacement from the previous reference point is the first linking vector in gyro rate space. The corresponding fHRate$_o$ vector is also selected and becomes the new reference point in derived helmet orientation rate space, the vector displacement of the new to the previous reference point becomes the first linking vector in derived helmet orientation rate space.

(3) Test each subsequently received fGRate vector until one is found for which the magnitude of a vector linking the new point to the reference point in gyro rate space exceeds the predefined minimum and the new vector is reasonably orthogonal to the first linking vector. The latest point satisfying these criteria then becomes the new reference point, giving two reasonably orthogonal linking vectors in gyro rate space. The corresponding fHRate$_o$ vector is also selected and becomes the new reference point in derived helmet orientation rate space.

(4) Test each subsequently received fGRate vector until one is found for which the magnitude of the vector linking the new point to the reference point in gyro rate space exceeds the predefined minimum and the new vector is reasonably orthogonal to the plane of the first two linking vectors. The latest point then becomes the new reference point in gyro rate space. The corresponding fHRate$_o$ vector is also selected and becomes the new reference point in derived helmet orientation rate space. This results in a set of four points in gyro rate space and a corresponding set of four points in derived helmet orientation rate space, each set of four points defining three linking vectors extending from the reference point to the other three points in the respective rate space.

The parameters defining 'minimum' magnitude and 'reasonably orthogonal' are defined during a system configuration process, the objective being to ensure that the resultant vectors linking the four points in gyro rate space are 'reasonably' tetrahedral in configuration, i.e. each point lies at least a minimum distance away from the plane of the other three points.

During any one corrections update cycle, there may be more than one new fGRate vector available, for example where the tracker cycle period (matched to the period between successive samples of rate data from the Helmet-mounted Gyros 5) is a predetermined fraction of the corrections update cycle period (matched to the period between successive measurements of helmet orientation by the Optical Helmet Tracker 10). Optionally, all fGRate vectors available during any one corrections update cycle may be tested for acceptance into the sample set until at least one is accepted according to the selection criteria, or only one fGRate vector may be selected for testing during each corrections update cycle.

When a set of four points in gyro rate space—fGRate vectors—and four corresponding points in derived helmet orientation rate space—fHRate$_o$ vectors—have been acquired satisfying the selection criteria, the Calculate Gyro Corrections component 30 is triggered to begin a new calculation of the correction for misalignment.

Updates to an already assembled sample set are made according to the further step:

(5) Test each subsequently received fGRate vector in the same way to determine whether the new vector is suitable. That is:

The magnitude of a vector linking the new point to the reference point in rate space exceeds the predefined minimum;

The direction of the vector linking the reference point and the new point is reasonably orthogonal to the plane of the previous two linking vectors in gyro rate space, i.e. the vectors formed by the three most recently accepted points.

If accepted, the latest fGRate vector defines the reference point and its vector separation from the previous reference point replaces the oldest of the three linking vectors in gyro rate space. The corresponding fHRate$_o$ vector is also selected and becomes the reference point in derived helmet orientation rate space, replacing the oldest point in derived helmet orientation rate space.

The number of corrections update cycles required to assemble a set of four suitable fGRate vectors depends upon the type of helmet movement taking place at the time and may therefore vary. The required number of corrections update cycles may be reduced if more than one new fGRate vector is available during each corrections update cycle, for example if multiple tracker cycles have elapsed within the period of one corrections update cycle, and if the helmet movement at the time results in the required variation between successive samples of GRate$_g$ vectors.

Acceptance of a new fGRate vector into an existing sample set of four points triggers a new calculation by the Calculate Gyro Corrections component 30 during which a 3×3 correction matrix M is calculated, representing a transformation to align the set of three linking vectors in gyro rate space to the three corresponding linking vectors in derived helmet orientation rate space.

Various techniques may be applied to control the introduction of an update to a correction matrix M by the Apply Gyro Corrections component 35 for a given tracker cycle. A combination of stabilisation control and damping techniques may be applied, for example within the Apply Gyro Corrections component 35, with the objective of reducing the impact of potentially large corrective swings upon the repositioning of symbols in an associated display of tracked symbols while the fGRate data are being gathered and the quality of the assembled sample set and hence of the calculated corrections is being refined. According to the applied stabilisation control technique, a diminishing proportion of a correction determined during a current corrections update cycle is mixed with a correspondingly increasing proportion of the correction determined during the immediately preceding corrections update cycle. This provides for a relatively large correction in the first correction cycle and successively smaller corrections over subsequent correction cycles, by which time the system may be expected to have stabilised. Meanwhile, at the tracker cycle level, a damping process gradually applies a newly determined correction over a number of tracker cycles so that not only is the height of each new corrective step diminished over a number of corrections update cycles, by the stabilisation control process, but each corrective step is also introduced gradually over a number of the intervening tracker cycles, so preventing an abrupt correction being applied to gyro rate data (and hence to the repositioning of symbols in the display) while the correction stabilises.

The calculation of corrections and the application of stabilisation and damping techniques according to the present invention will now be described in more detail.

Having triggered a new corrections calculation by an acceptable update to the sample set, the Calculate Gyro Corrections component 30 first calculates a new misalignment matrix Mis according to:

$$Mis = DHr \cdot DGr^{-1} \qquad (2)$$

where

DGr is a 3×3 matrix whose columns comprise the three linking vectors in gyro rate space expressed as column vectors; and DHr is a 3×3 matrix whose columns comprise the three corresponding linking vectors in derived helmet orientation rate space expressed as column vectors.

In a typical helmet tracker installation, the misalignment matrix Mis is likely to remain substantially unchanged from one correction cycle to the next, having stabilised. However, until stabilisation is achieved, as more data are collected, the calculated misalignment matrix Mis will be updated, possibly sporadically, but gradually stabilises to a matrix representing the 'true' gyro misalignment correction. The time required to achieve stabilisation depends upon the type of helmet movement taking place. During that time, by the stabilisation control technique mentioned above and to be described below, some control may be applied to reduce the potential effects on an associated display system, for example, of the evolving sporadic corrections. Once stabilisation is achieved, the misalignment matrix Mis is only likely to change significantly if there is an impact or other cause of a change in the alignment of the Helmet-mounted Gyros 5 on the helmet if not firmly fixed. However, in other applications of the present invention, for example to a head-mounted tracker system intended for use with computer gaming head-mounted displays, it is possible that there will be a need for frequent adjustments to the misalignment corrections to be calculated and applied. The present invention provides the means for making those adjustments automatically, as and when they are required, provided that the helmet reference frame and hence the frame of reference of the associated non-inertial tracker system (10) remains fixed.

Having calculated a misalignment matrix Mis from the latest sample set of rate vectors, a new correction matrix M is computed, applying the stabilisation control technique, according to the equation:

$$M = dM \cdot Mis + (1 - dM) \cdot GMis \qquad (3)$$

where M is the new correction matrix, GMis is the misalignment matrix from the immediately preceding corrections update cycle and dM defines a proportion of the contribution to the correction matrix M by the newly calculated misalignment matrix Mis versus the contribution from an immediately preceding misalignment correction GMis. The parameter dM begins at a relatively high value (close to 1), allowing a relatively large corrective effect on the first corrections update cycle by a newly calculated misalignment matrix Mis, but the contribution of successive calculated updates to the matrix Mis is reduced in stages to a predefined minimum value in comparison with the corrective effect provided by the immediately preceding update to the matrix Mis, as the correction evolves. This has the effect of reducing the peak 'amplitude' of subsequent corrections defined by updates to the matrix M.

In between updates to the correction matrix M, the above-mentioned damping process is applied by the Calculate Gyro Corrections component 30 to introduce each new correction represented by the matrix M gradually over a number of tracker cycles. By this process, the actual correction GMis' that is to be applied by the Apply Gyro Corrections component 35 to the GRate data for the latest tracker cycle is calculated according to the equation:

$$GMis' = (1-k_M) \cdot GMis + k_M \cdot M \quad (4)$$

where GMis' is the correction matrix to be used in respect of the latest tracker cycle, GMis is the correction matrix from the previous tracker cycle, $k_m$ is a fixed pre-configured constant of integration for the misalignment correction and M is the correction matrix determined by equation (3) for the current corrections update cycle. The damping process is an iterative process in which the correction matrix GMis' replaces GMis in equation (4) when determining the correction to be applied for the next tracker cycle so that the correction represented by GMis gradually converges to the correction represented by M over a number of tracker cycles, or until a new corrections calculation is triggered and the correction matrix M is re-calculated.

For each new tracker cycle for which a new filtered rate vector fHRate$_o$ is available from the Filter component 115, synchronised with the filtered gyro rate vector fGRate from that new tracker cycle, the latest correction matrix GMis', as calculated according to equation (4), is applied by the Calculate Gyro Bias component 40 to the filtered gyro rate vector fGRate to give a point in the derived helmet orientation rate space. A new bias correction vector B is calculated by the Calculate Gyro Bias component 40 as the vector translation B in the derived helmet orientation rate space between the point represented by the corrected fGRate vector and the point represented by the corresponding synchronised rate vector fHRate$_o$ according to the equation:

$$B = fHRate_o - GMis' \cdot fGRate \quad (5)$$

Gyro bias tends to be temperature-related and so changes relatively slowly, but the bias correction is calculated at each tracker cycle for which a new synchronised pair of filtered rate vectors fHRate$_o$ and fGRate is available to the Calculate Gyro Bias component 40. An iterative damping process, similar to that applied to the correction matrix M according to equation (4), may be applied by the Calculate Gyro Bias component 40 to the application of each new bias correction B to smooth the application of a new bias correction over several tracker cycles. By this process, the actual bias correction vector output by the Calculate Gyro Bias component 40, to be applied by the summing component 45 to the corrected GRate vector output by the Apply Gyro Corrections component 35, is calculated according to the equation:

$$GBias' = (1-k_B) \cdot GBias + k_B \cdot B \quad (6)$$

where GBias' is the bias correction vector to be applied in respect of the latest complete tracker cycle, $k_B$ is a pre-configured constant of integration for the bias correction, GBias is the bias correction vector from the immediately preceding complete tracker cycle and B is the new bias correction vector determined by equation (5). As this damping process is an iterative process, GBias' replaces GBias in equation (6) when determining the bias correction vector to be applied for the next tracker cycle so that the correction represented by GBias gradually converges to the required bias correction over a number of tracker cycles. The constant $k_B$ is chosen to ensure that the applied bias corrections keep pace with the bias drift but suppress noise. However, the accuracy of the bias correction applied depends upon the accuracy of the misalignment correction matrix M. The accuracy of that improves with the capture of more data and the same is therefore true of the bias corrections.

As an alternative to using a fixed value for the parameter $k_B$ in equation (6), which may result in a large number of cycles for the bias vector to converge to a valid state following initialisation of the correction calculation components 30, 40, the parameter $k_B$ may be replaced in equation (6) by the value 1/n, where n is the number of completed bias calculations by the component 40 for which $1/n > k_B$. As a result, the first n iterations of equation (6) will return the cumulative average bias vector. For subsequent iterations, equation (6) may be applied using the constant value $k_B$ to give a smooth transition to exponential filtering. The bias vector will therefore be close to its calculated value from the outset and can be used without waiting for the smoothing process to converge.

When the bias correction vector GBias' is added by the summing component 45 to the output of the Apply Gyro Corrections component 35, the result is, when stabilised, a fully corrected rate of change in helmet orientation vector $$HRate_c = GMis' \cdot GRate + GBias' \quad (7)$$

for the latest tracker cycle.

The correction matrix M may be initialised, for the purposes of system power-up or reset, to a nominal state at the time of system configuration, representing a best estimate of the misalignment between gyro axes and helmet-referenced axes obtained from off-aircraft calibration or design data. The bias correction vector B may be initialised upon system start-up or reset to represent a zero displacement.

As mentioned above, as an alternative to operating a dynamic process of calculation of gyro misalignment or scaling errors, if such errors are unlikely to vary during operation in a particular application, the correction matrix M may be determined by trials prior to operation of the tracker system and stored for subsequent retrieval and application on the assumption that it will not need to be changed. The Apply Gyro Corrections component 35 may then apply the predetermined misalignment correction matrix M to received gyro rate data GRate at each tracker cycle. The Calculate Bias Corrections component 40 may operate at each tracker cycle to compensate for bias drift, but using the predetermined misalignment correction matrix M in the calculation of any updates to the bias correction vector B. Application of the above-described stabilisation and damping techniques in respect of the correction matrix M may also be suspended during steady state operation.

The Integrator component 50 receives the fully corrected rate of change in helmet orientation vector HRate$_c$ in respect of the latest complete tracker cycle and inserts it into an integration process to determine a helmet orientation relative to World axes expressed as a quaternion HW. This may be converted to an orientation HA relative to a frame of reference of the aircraft or other associated platform, whether fixed or moving, using orientation data AW output by the Aircraft Navigation System 15 or other sensor system, as required. The resultant quaternion representation of orientation may also be converted into an angle-axis representation of orientation, as required.

A typical implementation of a helmet tracker system incorporating the inertial sensor correction functionality of the present invention will now be described with reference to FIG. 4.

Figure 4:
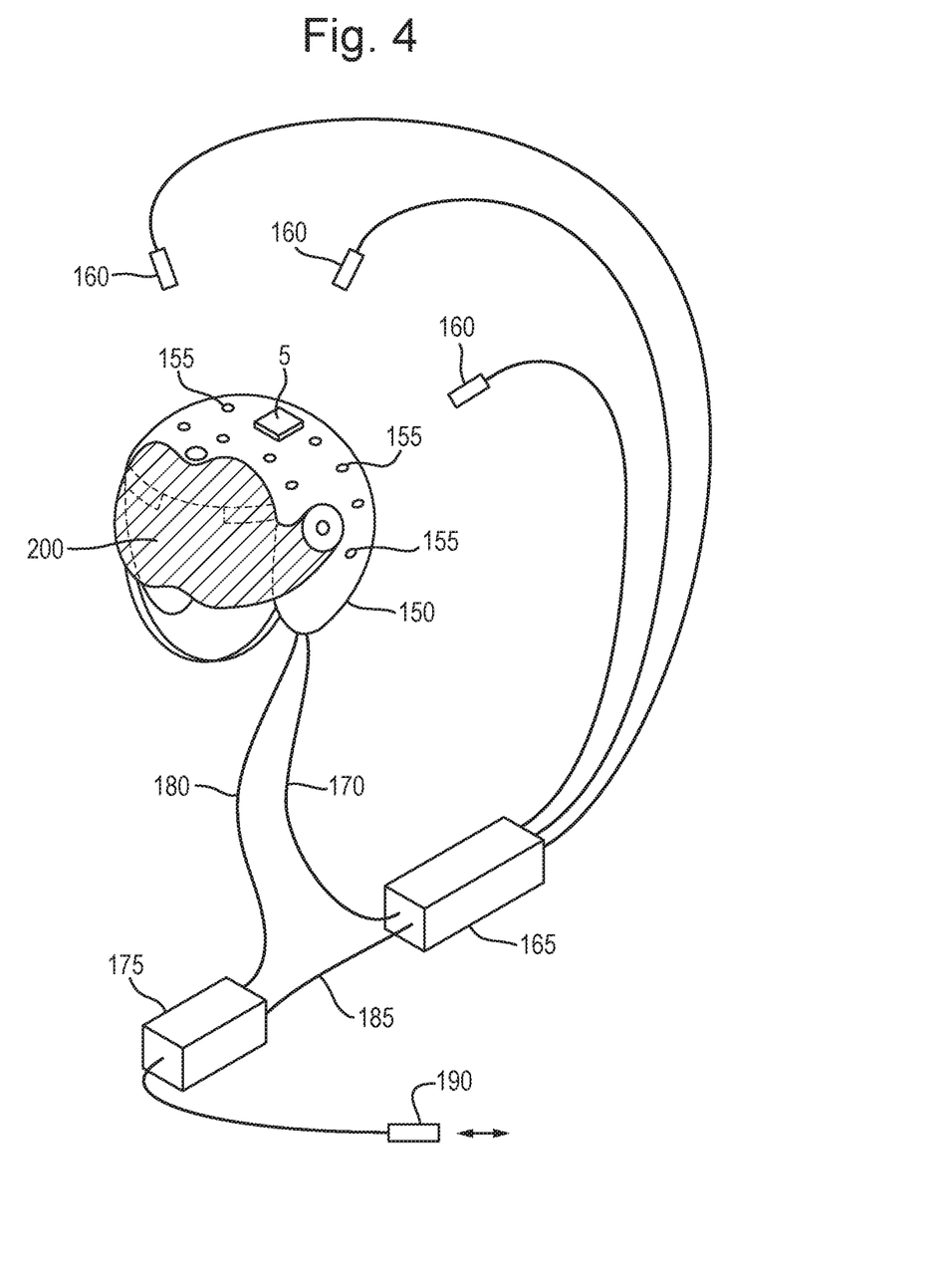
FIG. 4 depicts a representation of a helmet with components suitable for implementing and benefiting from functionality according to example embodiments of the present invention.

Referring to FIG. 4, a helmet tracker system is shown integrated with a helmet 150. The helmet tracker system comprises a Helmet-mounted Gyros 5 component, typically a single inertial sensor module containing three gyro elements, fitted to the external shell of the helmet 150, and an Optical Helmet Tracker system. The Optical Helmet Tracker system comprises an arrangement of LEDs 155 integrated within or mounted upon the external shell of the helmet 150 and an arrangement of one or more Cameras 160, each mounted at a fixed position, e.g. within an aircraft cockpit, such they have a line of sight view to at least some of the LEDs 155 at any likely orientation of the helmet 150.

An Optical Helmet Tracker Controller 165 is linked to each of the Cameras 160 to receive image data resulting from the detection of light emitted by the LEDs 155 within the camera's line of sight. The Controller 165 is also linked to the LEDs 155 in the helmet 150 by means of an appropriate Cable 170 such that it may control the illumination of the LEDs 155. The Controller 165 is arranged, for example, to trigger a cyclic illumination of the LEDs 155 in predetermined patterns, to receive the resultant image data from the Cameras 160. The Controller 165 includes a digital processor programmed to implement an appropriate Optical Helmet Tracker algorithm, or a combination of hardware and software-implemented functionality, arranged to illuminate the LEDs 155 and to interpret the resultant image data from the cameras 160 to determine helmet orientation relative to a frame of reference associated with the aircraft, in this example.

A further Processing Module 175 is provided to implement the functionality of the overall helmet tracker system as described above with reference to FIGS. 1 to 3. The Processing Module 175 is linked to the helmet 150 by means of an appropriate Cable 180, principally to receive rate data $GRate_g$ output from the Helmet-mounted Gyros 5, but also to convey image data received from an aircraft-installed image generation system (not shown in FIG. 5), via an interface 190, to a helmet-mounted display integrated within the helmet 150 (not shown explicitly in FIG. 4). The helmet-mounted display system may be a visor-projection display system, or a waveguide-based display, arranged in either case to present images to the pilot such that they appear overlain upon the pilot's view through a visor 200 of an external scene. The Processing Module 175 is arranged to output measures of helmet orientation HA and HW to the aircraft-installed image generation system via the interface 190 for use in calculating the position of certain types of symbol and data intended for display in the helmet-mounted display, as appropriate.

In a typical aircraft installation of a helmet-mounted display system, incorporating the hybrid helmet tracker system of the present invention, one or more further modules (not shown in FIG. 4) are likely to be installed within the aircraft for the purposes of generating images for display by any display systems installed or in use on the aircraft. Such display systems may include a head-up display (HUD) and/or a head-down display (HDD) in addition to the helmet-mounted display of relevance to applications of the present invention. Such further modules are likely to be linked to a standard aircraft data bus and so have access to aircraft orientation data AW output by an Aircraft Navigation System and to data from other systems with a need to display information to the pilot. Image data including symbols and data for display on the helmet-mounted display, together with updates to aircraft orientation AW received over the aircraft data bus by such further modules, may be passed to the Processing Module 175 by means of the interface 190.

Example embodiments of the present invention have been described in the context of determining orientation of a helmet carrying a helmet-mounted display. This is one example of an application of a tracker system improved by the inclusion of inertial sensor data correction functionality according to the present invention in which the determined orientation is required by an associated image generator to be able to position space-stabilised symbols in an image to be displayed. However, it will be clear to a person of ordinary skill in a relevant field that the techniques described herein may be applied to the determination of orientation of any object with reference to a moveable platform associated with the object, for example a platform on or in which the object is travelling at the time its orientation is to be determined.

It will also be clear to the notional skilled person that particular features may be applied independently of others to provide a tracker system according to the present invention having different combinations of the features described. For example, the techniques described for determining corrections to be applied to inertial sensor data may be used independently of others not essential to the determination of such corrections.

The invention claimed is:

1. A method for correcting errors in rate data output by inertial sensors indicative of a rate of change in orientation in an inertial space of an object to which the inertial sensors are attached, the object also having associated therewith a non-inertial tracker system arranged to determine orientation of the object referenced to a frame of reference of a moveable platform with which the object is associated, the method comprising the steps:
   (i) receiving the rate data output by the inertial sensors;
   (ii) receiving orientation data from the non-inertial tracker system;
   (iii) receiving orientation data indicative of orientation of the moveable platform in the inertial space;
   (iv) deriving rate data from a synchronised combination of the orientation data received at steps (ii) and (iii) to provide a measure of the rate of change in the orientation of the object in the inertial space;
   (v) determining, from a synchronised combination of the rate data received at step (i) and the rate data derived at step (iv), a correction for errors in the rate data output by the inertial sensors due to misalignment, including non-orthogonality of axes of the inertial sensors or a difference in alignment of one or more axes of the inertial sensors and corresponding axes in a frame of reference of the non-inertial tracker system; and
   (vi) applying the correction determined at step (v) to the rate data output by the inertial sensors to obtain corrected rate data,
   wherein, at step (v), the correction is defined by a mapping between vectors linking points in an inertial sensor rate space represented by a sample set of the rate data received at step (i) and vectors linking points in a derived object orientation rate space represented by a corresponding synchronised sample set of the rate data derived at step (iv).

2. The method according to claim 1, further comprising the steps:
(vii) receiving the rate data output by the inertial sensors and, synchronised therewith, the rate data derived at step (iv);
(viii) applying to the rate data output by the inertial sensors received at step (vi) the correction due to the misalignment determined at step (v);
(ix) determining a vector translation between a point in the derived object orientation rate space represented by the corrected rate data and a point in the derived object orientation rate space represented by the corresponding synchronised sample set of the rate data derived, the determined vector translation representing a correction for bias in the rate data output by the inertial sensors; and
(x) adding the correction for bias determined at step (ix) to the rate data corrected at step (vi).

3. The method according to claim 2, wherein step (v) comprises:
(a) selecting a sample set of four measures of the rate data received at step (i) representing a substantially tetrahedral arrangement of points in the inertial sensor rate space;
(b) selecting four respectively synchronised measures of the rate data derived at step (iv) representing corresponding points in the derived object orientation rate space;
(c) defining three vectors linking a selected point to the other three points in the inertial sensor rate space and defining three corresponding vectors linking the respective corresponding points in the derived object orientation rate space;
(d) determining a mapping between the three linking vectors in the inertial sensor rate space and the three corresponding linking vectors in the derived object orientation rate space, the mapping representing the correction.

4. The method according to claim 3, further comprising the step:
(xi) testing each subsequently received measure of the rate data from the inertial sensors until a new measure is identified defining a new point in the inertial sensor rate space forming a substantially tetrahedral arrangement of points with the points defined by the three most recently received measures of the rate data in the sample set output by the inertial sensors, the new measure thereby replacing the oldest received measure of the rate data in the sample set output by the inertial sensors, and selecting corresponding synchronised measures of the rate data derived at step (iv) to replace the oldest in respect of the derived object orientation rate space, thereby triggering the determination of a new correction by steps (c) and (d).

5. The method according to claim 3, wherein step (i) further comprises applying a first type of filtering to a sample of the rate data output by the inertial sensors to define mean rate data representative of the sample for use in subsequent steps of the method.

6. The method according to claim 5, wherein step (i) further comprises applying a second type of filtering to the mean rate data resulting from an application of the first type of filtering and wherein step (iv) further comprises applying the second type of filtering to derive the rate data, thereby to suppress noise in the rate data.

7. The method according to claim 6, wherein applying the second type of filtering comprises applying a finite impulse response filter or an infinite impulse response filter.

8. The method according to claim 2, comprising operating steps (i) to (v) and steps (vii) to (ix) in a cyclic process representing a corrections update cycle having a first period and operating steps (vi) and (x) in a cyclic process representing a tracker cycle having a second period, wherein the first period of the corrections update cycle is a predetermined integer multiple of the second period of the tracker cycle.

9. The method according to claim 8, wherein step (v) further comprises operating a stabilisation control process, triggered to operate over a sequence of corrections update cycles.

10. The method according to claim 9, wherein step (vi) further comprises operating a damping process over a sequence of tracker cycles to smooth the application of the correction to be applied in respect of the most recent corrections update cycle.

11. The method according to claim 8, wherein step (x) further comprises operating a damping process over a sequence of tracker cycles to smooth the application of the bias correction to be applied over the sequence of tracker cycles.

12. A computer program product comprising a data carrier having stored thereon software code means, or means for access thereto, which when installed and executed upon a digital processor are arranged to implement the method steps recited in claim 1.

13. A digital processor programmed to implement the method steps recited in claim 1.

14. A tracker system for determining orientation of an object, comprising:
an inertial sensor arrangement associated with the object, arranged to output rate data providing cyclic indications of a rate of change in orientation of the object in an inertial space;
a non-inertial tracker system associated with the object, arranged to output cyclic determinations of orientation of the object, referenced to a frame of reference of a moveable platform associated with the object;
a source of orientation data providing cyclic measurements of orientation of the moveable platform in the inertial space;
a rate data generator for converting successive determinations of orientation of the object by the non-inertial tracker system combined with respective synchronised measurements of orientation of the moveable platform into respective measures of rate data indicative of the rate of change in the orientation of the object in the inertial space;
a corrector component arranged to determine a correction for errors in the rate data output by the inertial sensor arrangement, the correction determined from a synchronised combination of the rate data output by the inertial sensor arrangement and the rate data indicative of the rate of change in the orientation of the object in the inertial space determined by the rate data generator and to apply the correction to the rate data output by the inertial sensor arrangement in respect of a given cycle to obtain corrected rate data, the correction being defined by a mapping between vectors linking points in an inertial rate space represented by a sample set of the rate data output by the inertial sensor arrangement and vectors linking point in a derived object orientation rate space represented by a corresponding synchronised sample set of the rate data determined by the rate data generator; and an integrator component to receive the corrected rate data from the corrector component and to calculate therefrom the orientation of the object referenced to the inertial space.

15. The tracker system according to claim 14, wherein the non-inertial tracker system is an optical tracker system, an acoustic tracker system or a magnetic tracker system.

16. The tracker system according to claim 14, wherein the object is a head or a helmet or other body-worn item to which the inertial sensor arrangement is attached and wherein the inertial sensor arrangement is arranged to determine and to output the rate data indicative of a rate of change in orientation of the head or the helmet or the other body-worn item in the inertial space.

* * * * *